United States Patent
Niinuma et al.

(10) Patent No.: US 11,557,149 B2
(45) Date of Patent: Jan. 17, 2023

(54) IMAGE SYNTHESIS FOR BALANCED DATASETS

(71) Applicants: FUJITSU LIMITED, Kawasaki (JP); CARNEGIE MELLON UNIVERSITY, Pittsburgh, PA (US)

(72) Inventors: Koichiro Niinuma, Sunnyvale, CA (US); Laszlo A. Jeni, Sunnyvale, CA (US); Itir Onal Ertugrul, Sunnyvale, CA (US); Jeffrey F. Cohn, Sunnyvale, CA (US)

(73) Assignees: FUJITSU LIMITED, Kawasaki (JP); CARNEGIE MELLON UNIVERSITY, Pittsburgh, PA (US)

( * ) Notice: Subject to any disclaimer, the term of this patent is extended or adjusted under 35 U.S.C. 154(b) by 210 days.

(21) Appl. No.: 16/994,530

(22) Filed: Aug. 14, 2020

(65) Prior Publication Data
US 2022/0051003 A1 Feb. 17, 2022

(51) Int. Cl.
| | |
|---|---|
| G06V 40/16 | (2022.01) |
| G06K 9/62 | (2022.01) |
| G06N 20/00 | (2019.01) |
| G06T 5/50 | (2006.01) |
| G06T 15/20 | (2011.01) |
| G06N 3/04 | (2006.01) |
| G06N 3/08 | (2006.01) |
| G06T 11/00 | (2006.01) |

(52) U.S. Cl.
CPC ......... *G06V 40/176* (2022.01); *G06K 9/6256* (2013.01); *G06N 20/00* (2019.01); *G06T 5/50* (2013.01); *G06T 15/205* (2013.01)

(58) Field of Classification Search
CPC .... G06V 40/176; G06K 9/6256; G06N 20/00; G06T 5/50; G06T 15/205; G06T 11/00
USPC .................................................. 345/419-427
See application file for complete search history.

(56) References Cited

PUBLICATIONS

Zhe Li, Yi Jin, Yidong Li, Zhiping Lin, Shan Wang, Imbalanced Adversarial Learning for Weather Image Generation and Classification, 2018, IEEE Proceedings of ICSP2018, pp. 1093-1097 (Year: 2018).*

Snehal Bhatia, Generative Adversarial Networks for Improving Imbalanced Classification Performance, 2019, Dissertation, University of Dublin, pp. 1-82 (Year: 2019).*

(Continued)

*Primary Examiner* — Michael J Cobb
(74) *Attorney, Agent, or Firm* — Maschoff Brennan

(57) ABSTRACT

A method may include obtaining a dataset including a target Action Unit (AU) combination and labeled images of the target AU combination with at least a first category of intensity for each AU of the target AU combination and a second category of intensity for each AU of the target AU combination. The method may also include determining that the first category of intensity for a first AU has a higher number of labeled images than the second category of intensity for the first AU, and based on the determination, identifying a number of new images to be synthesized in the second category of intensity for the first AU. The method may additionally include synthesizing the number of new images with the second category of intensity for the first AU, and adding the new images to the dataset.

18 Claims, 10 Drawing Sheets

(56) References Cited

PUBLICATIONS

Yong Zhao, Le Yang, Ercheng Pei, Meshia Cédric Oveneke, Mitchel Alioscha-Perez, Longfei Li, Dongmei Jiang, Hichem Sahli, Action Unit Driven Facial Expression Synthesis from a Single Image with Patch Attentive GAN, 2021, Computer Graphics Forum, 40(6):47-61 https://doi.org/10.1111/cgf.14202 (Year: 2021).*
Connor Shorten, Taghi M. Khoshgoftaar, A Survey on Image Data Augmentation for Deep Learning, 2019, Journal of Big Data, 6:60, pp. 1-48, https://doi.org/10.1186/s40537-019-0197-0 (Year: 2019).*
Robert Walecki, Ognjen Rudovic, Vladimir Pavlovic, Bjoern Schuller, Maja Pantic, Deep Structured Learning for Facial Action Unit Intensity Estimation, 2017, IEEE Conference on Computer Vision and Pattern Recognition, pp. 5709-5718, doi:10.1109/CVPR.2017.605 (Year: 2017).*
Zhilei Liu, Guoxian Song, Jianfei Cai, Tat-Jen Cham, Juyong Zhang, "Conditional Adversarial Synthesis of 3D Facial Action Units", 2018, retrieved from https://arxiv.org/pdf/1802.07421.pdf (Year: 2018).*
Pengfei Dou, Shishir K. Shah, Ioannis A. Kakadiaris, "End-to-End 3D Face Reconstruction with Deep Neural Networks," 2017, 2017 IEEE Conference on Computer Visioon and Pattern Recognition (CVPR), pp. 5908-5917 (Year: 2017).*
Yuqian Zhou, Bertram Emil Shi, "Photorealistic Facial Expression Synthesis by the Conditional Difference Adversarial Autoencoder," 2017, 2017 Seventh International Conference on Affective Computing and Intelligent Interaction (ACII) (Year: 2017).*
Ninuma et al. "Unmasking the Devil in the Details: What Works for Deep Facial Action Coding?" BMVC 2019, Sep. 9, 2019.
Mavadati et al. "DISFA: A Spontaneous Facial Action Intensity Database" IEEE Transactions on Affective Computing, Apr. 2013, vol. 4(2), pp. 151-160.
Iman Abbasnejad et al. "Using synthetic data to improve facial expression analysis with 3d convolutional networks" International Conference on Computer Vision Workshops (ICCVW), Oct. 2017.
Dimitrios Kollias et al. "Deep neural network augmentation: Generating faces for affect analysis" International Journal of Computer Vision (IJCV), Feb. 22, 2020.
Xinyue Zhu et al. "Emotion classification with data augmentation using generative adversarial networks" Pacific-Asia Conference on Knowledge Discovery and Data Mining, pp. 349-360, 2018.
Yunjey Choi et al. "Stargan: Unified generative adversarial networks for multi-domain image-to-image translation" In Proceedings of the IEEE Conference on Computer Vision and Pattern Recognition, Sep. 2018; pp. 8789-8797.
A. Pumarola et al. "Ganimation: One-shot anatomically consistent facial animation" International Journal of Computer Vision (IJCV), Aug. 24, 2019.
X. Zhang et al. "BP4D-spontaneous: a high-resolution spontaneous 3D dynamic facial expression database" Image and Vision Computing, 32(10):692-706, Jun. 2014.
Z. Zhang et al. "Multimodal spontaneous emotion corpus for human behavior analysis" In Proceedings of the IEEE Conference on Computer Vision and Pattern Recognition (CVPR), pp. 3438-3446, Jun. 2016.

* cited by examiner

IMAGE SYNTHESIS FOR BALANCED DATASETS

FIELD

Embodiments of the present disclosure relate to image synthesis for balanced datasets.

BACKGROUND

Image analysis can be performed on images of faces to identify which facial expression is being made. Often, these facial expressions are characterized based on the Facial Action Coding System (FACS) using Action Units (AUs), where each AU may correspond to the relaxation or contraction of a particular muscle or group of muscles. Each AU may further be characterized by an intensity, often labeled 0 and A-E with 0 representing no intensity or the absence of the AU, and A-E ranging from minimum to maximum intensity, respectively. A given emotion may be characterized as a combination of AUs, such as 6+12 (cheek raiser and lip corner puller) representing happiness.

SUMMARY

One or more embodiments of the present disclosure may include a method that includes obtaining a dataset including a target Action Unit (AU) combination and labeled images of the target AU combination with at least a first category of intensity for each AU of the target AU combination and a second category of intensity for each AU of the target AU combination. The method may also include determining that the first category of intensity for a first AU has a higher number of labeled images than the second category of intensity for the first AU, and based on the determination, identifying a number of new images to be synthesized in the second category of intensity for the first AU. The method may additionally include synthesizing the number of new images with the second category of intensity for the first AU, and adding the new images to the dataset.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

The present disclosure relates to the generation of a robust dataset that may be used to train a machine learning system to identify the AUs and/or their intensities in an input image. In many potential training datasets, the potential images to pull from are not evenly distributed across intensities for AUs, causing an imbalance in the training of the machine learning system. To overcome this deficiency, the present disclosure provides an improvement whereby a more robust and balanced dataset is developed. While the term image is used, it will be appreciated that it is equally applicable to any other representations of faces.

In some embodiments, a training dataset may be analyzed to determine the balance of intensities across AU combinations, and based on an imbalance, synthesizing images to provide more balance to the training dataset. The more-balanced dataset may be used to train a machine learning system for image classification, and after training, the machine learning system may be used to label an input image with AU combinations and/or intensities within the input image. For example, the machine learning system may identify which AUs are present (e.g., a binary decision) and/or the intensities of the AUs that are present (e.g., multiple potential intensity levels).

Certain embodiments of the present disclosure may provide improvements over previous iterations of machine learning systems for facial image analysis. For example, embodiments of the present disclosure may provide a more balanced dataset for training such that the machine learning system is better able to identify and characterize an input image to the machine learning system. Additionally, because the present disclosure synthesizes certain images, certain embodiments may permit a machine learning system to operate with a training set with fewer initial input images, reducing the cost (both computationally and economically) of preparing a larger training dataset. Additionally, because the present disclosure may provide a superior training set to the machine learning system, the machine learning system itself may operate more efficiently and arrive at a determination more quickly, thus saving computing resources spent on longer analyses compared to the present disclosure.

One or more example embodiments are explained with reference to the accompanying drawings.

Figure 1:
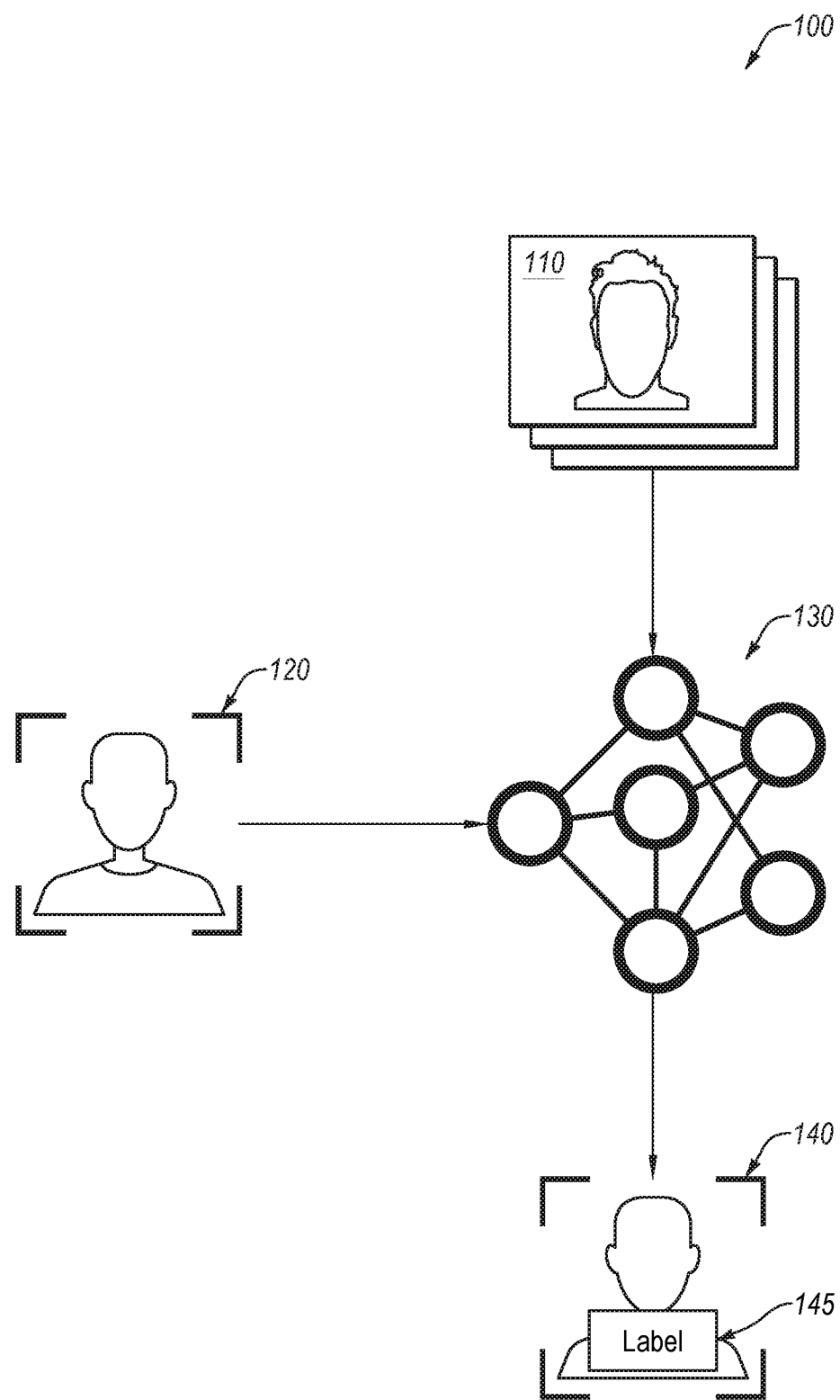
FIG. 1 is a diagram illustrating an example environment that may be used for image analysis on a facial image.

FIG. 1 is a diagram illustrating an example environment 100 that may be used for image analysis on a facial image, in accordance with one or more embodiments of the present disclosure. As illustrated in FIG. 1, the environment 100 may include a dataset 110 of images that may be used to train a machine learning system 130. After being trained, the machine learning system 130 may analyze an image 120 and generate a labeled image 140 with a label 145. For example, the label 145 may be applied to the image 120 to generate the labeled image 140.

The dataset 110 may include one or more labeled images. For example, the dataset 110 may include images of faces that may be labeled to identify which AUs are expressed in the image and/or the intensities of the AUs in the image. In some embodiments, one or more of the images in the dataset 110 may be artificially synthesized rather than being a native image such as an image captured by a camera or other image sensor. In some embodiments, the images of the dataset 110 may be manually labeled or may be automatically labelled.

The image 120 may be any image that includes a face. The image 120 may be provided as an input to the machine learning system 130.

The machine learning system 130 may include any system, device, network, etc. that is configured to be trained based on the dataset 110 such that the machine learning system 130 is able to identify the AUs and/or their respective intensities in the image 120. In some embodiments, the machine learning system 130 may include a deep learning architecture, such as a deep neural network, an artificial neural network, a convolutional neural network (CNN), etc. The machine learning system 130 may output the label 145, identifying one or more of the AUs in the image 120 and/or their respective intensities. For example, the machine learning system 130 may identify which AUs are present (e.g., a binary decision) and/or the intensities of the AUs that are present (e.g., multiple potential intensity levels).

The labeled image 140 may represent the image 120 when labeled with the label 145 indicating the AUs and/or their respective intensities as determined by the machine learning system 130.

Modifications, additions, or omissions may be made to the environment 100 without departing from the scope of the disclosure. For example, the designations of different elements in the manner described is meant to help explain concepts described herein and is not limiting. Further, the environment 100 may include any number of other elements or may be implemented with other systems or environments than those described.

Figure 2:
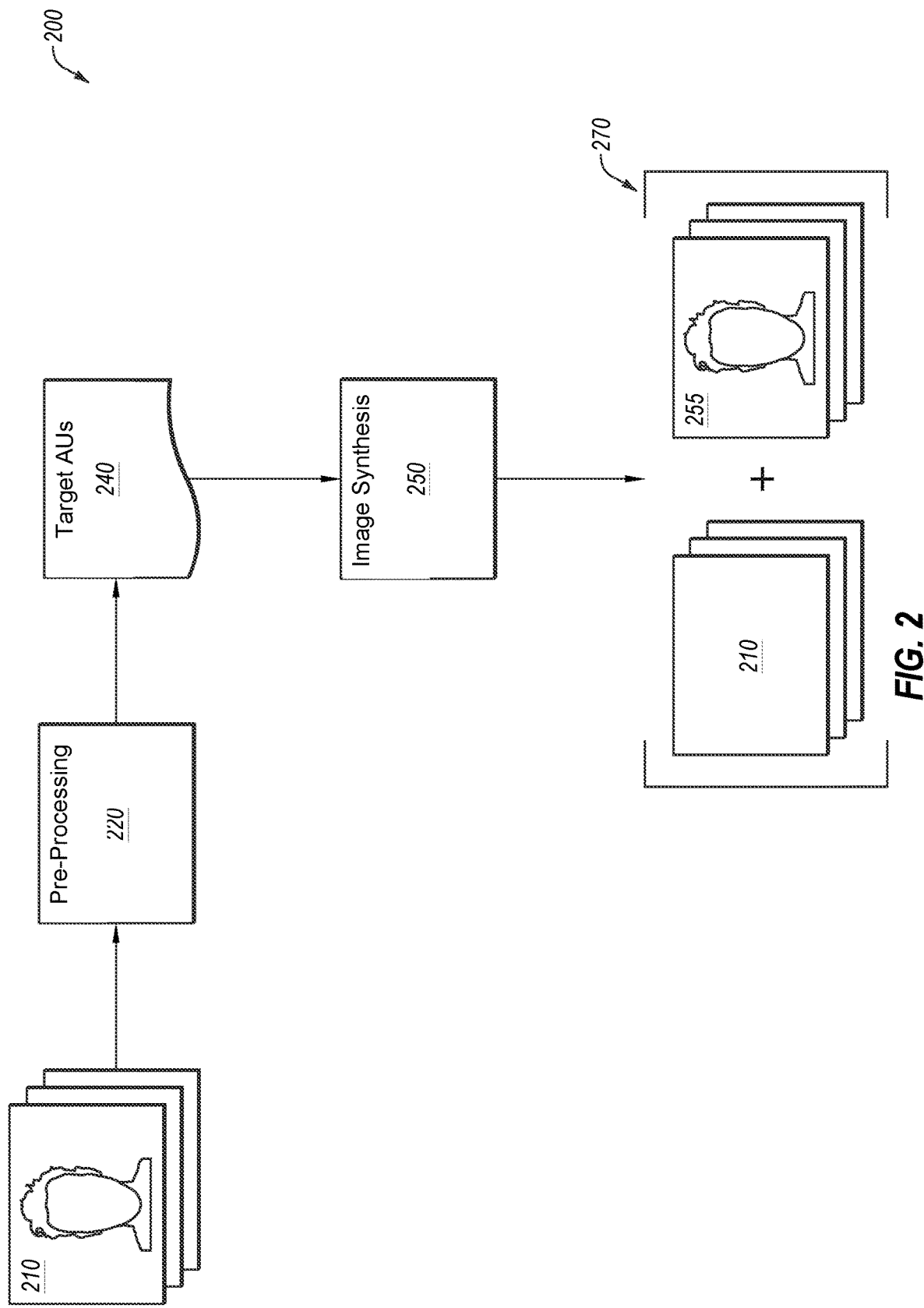
FIG. 2 illustrates an example environment for image synthesis for balanced datasets.

FIG. 2 illustrates an example environment 200 for image synthesis for balanced datasets, in accordance with one or more embodiments of the present disclosure. The environment 200 may include an initial dataset 210 that may be obtained. The initial dataset 210 may undergo some pre-processing 220 and/or other analysis to derive a set of target AUs 240 and/or their associated intensities. Using the target AUs 240 and/or their intensities, a set of new images to be synthesized to better balance the dataset 210 may be determined. Image synthesis 250 may be undertaken to generate the synthesized images 255, which may be combined with the initial dataset 210 to derive a final dataset 270.

The initial dataset 210 may be similar or comparable to the dataset 110. For example, the initial dataset 210 may include images that include faces with various AU combinations and associated intensities thereof. The initial dataset 210 may be labeled with the AU combinations and associated intensities for each of the images in the initial dataset 210. In some embodiments, such labels may be attached as part of the pre-processing 220. The images of the initial dataset 210 may take any form or format, such as digital photographs, scanned photographs, user-generated images depicting a photo-realistic face with a certain emotion, etc.

The pre-processing 220 may perform one or more analyses or tasks on the dataset 210 to facilitate derivation of the target AUs 240 and/or the image synthesis 250. In some embodiments, the pre-processing 220 may include labeling the images of the initial dataset 210 to identify which AU combination and/or intensity is depicted in each of the images. For example, an administrator, engineer, or other user may go through and manually label the images in the initial dataset 210. As another example, the labeling of the images may be crowd-sourced.

In some embodiments, the pre-processing 220 may include identifying one or more of the images in the dataset 210 as candidates for potential input images for the image synthesis 250. For example, images that include a neutral expression may be identified. As another example, images with few wrinkles and/or without an open mouth may be identified as candidates for potential input images. In some embodiments, the identification of the input images may include randomly selecting an image that is not depicting the target AU or an AU with in the AU combination. Additionally or alternatively, the identification of the input images may include randomly selecting an image without wrinkles that is outside of the target AU. For example, a set of known AUs and or intensities of certain AUs may be unlikely to produce wrinkles and an input image may be randomly selected from images depicting only the set of known AUs/intensities that are unlikely to produce wrinkles.

In some embodiments, the pre-processing 220 may include generating three-dimensional (3D) renderings of the images in the initial dataset 210. For example, the two-dimensional images may be projected and rendered in 3D to facilitate the image synthesis 250. In some embodiments, such 3D rendering may include use of video frames such that each frame of the video may be analyzed to better correlate across video frames to generate a more accurate 3D rendering. In some embodiments, an encoder-decoder architecture using convolutional layers and residual blocks is used for facial landmark alignment and 3D facial structure reconstruction. In these and other embodiments, a mapping may be learned from a video frame to a given UV position (e.g., a two-dimensional (2D) representation of the 3D coordinates in the UV space, while keeping information for each point). Using the 3D mapping, a 3D mesh of the face in a frontal view may be obtained, which may be rasterized into a 2D image of the face in a common size for the initial dataset 210.

Figure 4A:
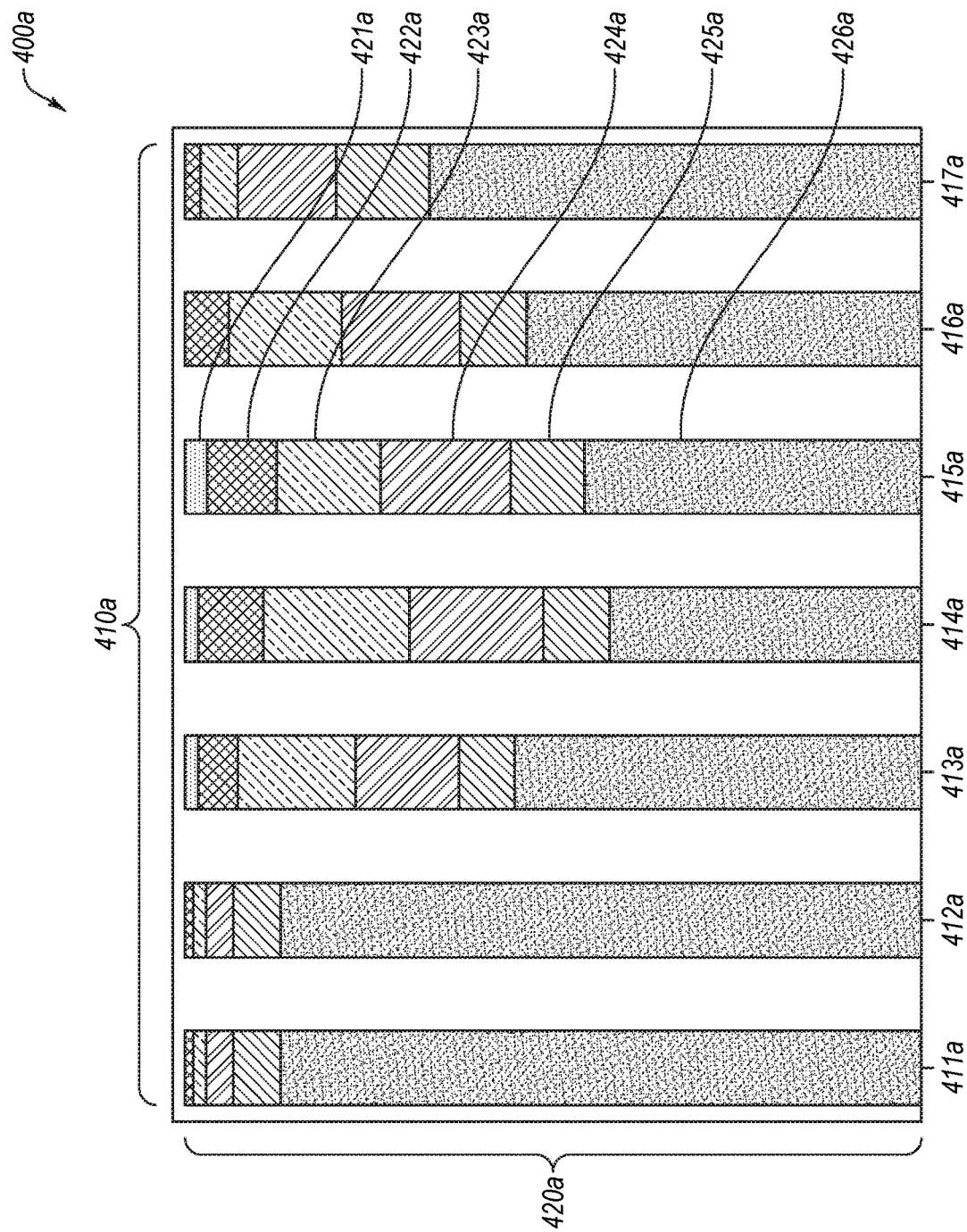
FIGS. 4A and 4B illustrate example plots of intensity distributions of AU combinations in a dataset.

In some embodiments, the pre-processing 220 may include an analysis of the initial dataset 210 to determine a number of intensities contained within the initial dataset 210 for one or more target AU combinations. For example, certain intensities, such as the higher intensities, may be under-represented relative to lower intensities for some AU combinations. The imbalance of intensities may lead to an imbalanced training set for the machine learning system that is to perform image identification. An example representation of an imbalanced dataset is illustrated in FIG. 4A.

In some embodiments, the pre-processing 220 may identify which AU combinations and/or corresponding intensities are out of balance. Such identification may facilitate identification of which AU combinations and/or intensities are to have corresponding images synthesized.

While examples are provided of various pre-processing that may be performed on the initial dataset 210, it will be appreciated that any other tasks or processing may be performed on the initial dataset 210 prior to and/or as part of the image synthesis 250.

The set of target AUs 240 and/or the associated intensities may include a set of AU combinations that are under analysis. For example, if the machine learning system is meant to target a subset of facial expressions, the corresponding AU combinations may be included in the target AUs 240. As another example, if the pre-processing 220 indicates that a subset of AU combinations and their associated intensities are out of balance, the subset of AU-combinations may be the set of target AUs 240. In some embodiments, the set of target AUs 240 may be selected manually be an administrator or other user.

The image synthesis 250 may include any automated image generation technique. For example, a Generative Adversarial Network (GAN) architecture or Variational autoencoder (VAE) may be used to generate the images. In some embodiments, an image generation package such as StarGAN or GANimation may be used, although any image generation technique may be used. For such a package, an input image and a target AU combination may be provided to the package, which may synthesize and output an image of the target AU combination. In some embodiments, the target AU combination provided to the package may include intensities for the AU combination.

In some embodiments, the image synthesis 250 may include one or more techniques to improve quality of synthesized images. For example, the image synthesis 250 may receive input images with a neutral expression and/or without wrinkles to improve the accuracy of the image synthesis 250. As another example, a 3D rendering of the input image may be generated to facilitate a higher quality image synthesis 250.

In some embodiments, the image synthesis 250 may utilize one or more loss analyses to be minimized to create a high quality image during training of the image synthesis 250 technique. For example, the image synthesis 250 may be trained on one or more data sets (such as the dataset 210 or some other dataset), and after being trained, may be used to synthesize images. Such training may include synthesizing training images that correspond to know and/or actual images in the training dataset. Minimizing losses may help to keep the identity of the original image the same when training, such that the same consistency may occur in the synthesis of images. Furthermore, minimizing losses may help to keep the synthesized image's expression the same as the target expression. For example, an identity loss metric may be utilized in which an identity of the input training image may be determined and an identity of the image synthesized during training may be determined, and if there is a mismatch in identity determination (e.g., an image identification system expects the input and synthesized training images to be of two different people), a certain loss factor may be applied. In these and other embodiments, the loss factor for the identity loss may be proportional to the likelihood the synthesized training image is a different person.

Another example of loss analysis of the image synthesis 250 training may include an idiosyncratic loss metric. The idiosyncratic loss metric may relate to a loss imposed based on a comparison of a synthesized training image with other images in the dataset of the same person in the source image with various intensities of the target AU. For example, if the same person had two images in the training dataset (e.g., a first image with a neutral expression and a second image with a facial expression with at least one of the target AUs), a loss may be imposed for any mismatch between the AU of the image in the training dataset with the AU in the synthesized training image. Such differences may include a change in identity, an unintended change in intensity, a change in perceived AU, etc.

Figure 4B:
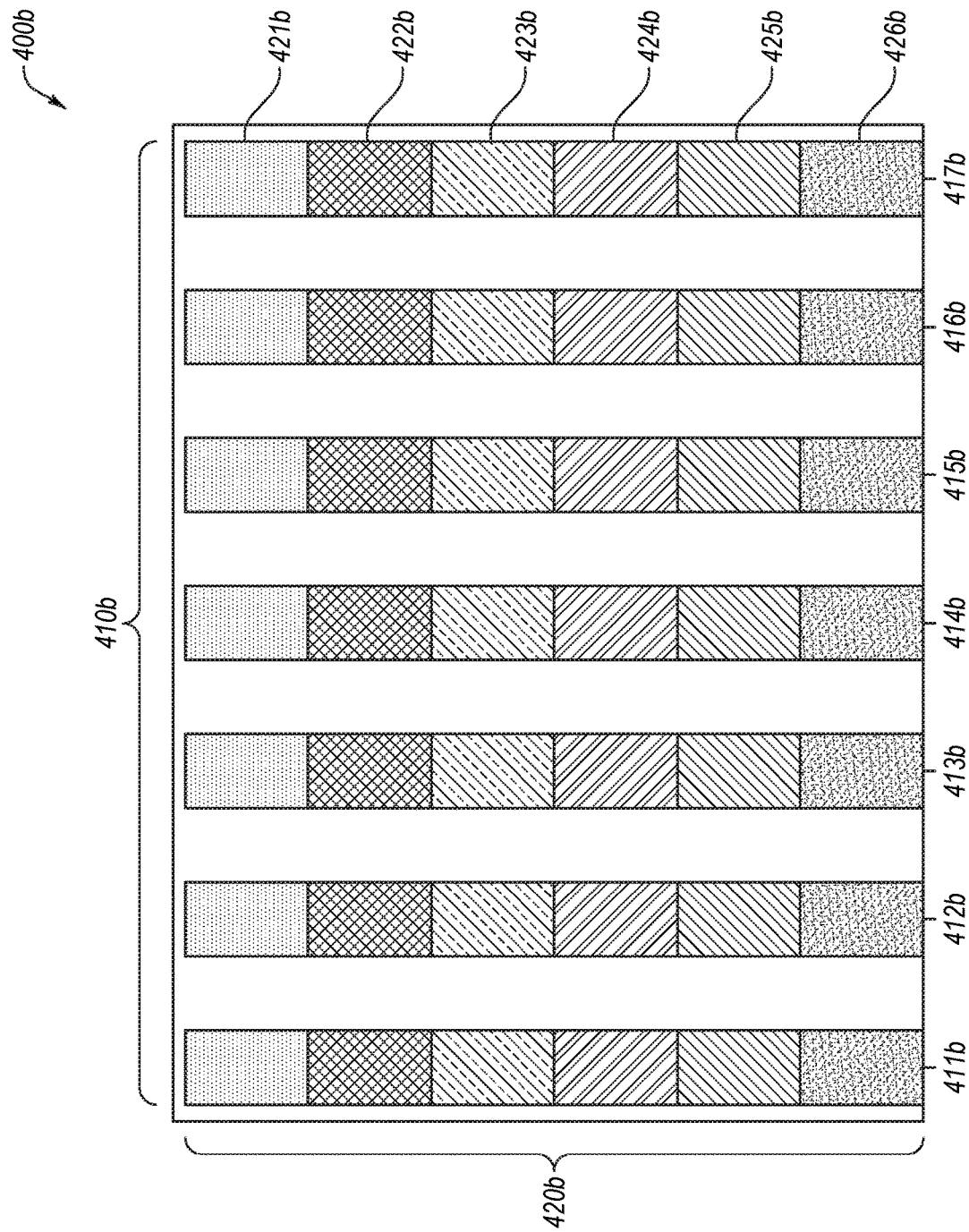

After training, the image synthesis 250 may output a set of synthesized images 255. For example, the set of synthesized images 255 may include images with the target AUs 240 and associated intensities such that, when combined with the initial dataset 210 as the final dataset 270, the final dataset may include a balanced training dataset across AU combinations and/or intensities. For example, FIGS. 4A and 4B illustrated an example of intensity distributions for the initial dataset 210 and the final dataset 270, respectively. In some embodiments, the synthesized images 255 may make up the entire final dataset 270, rather than including any of the images from the initial dataset 210. Alternatively, the resulting dataset 250 may include any combination of representations from dataset 210 and synthesized representations 245. For example, one or more images from the initial dataset 210 may be removed. Additionally or alternatively, a second dataset may be created from only synthesized images.

The final dataset 270 may be provided to a machine learning system to facilitate image classification and/or labeling such that AUs and/or their respective intensities may be identified and/or labeled for input images. In these and other embodiments, rather than oversampling AU combinations and/or intensities with only a few entries in the dataset (e.g., repeatedly introducing additional copies of the same image), the present disclosure may provide synthesized images with natural variations to provide a more robust and better-performing machine learning system.

Modifications, additions, or omissions may be made to the environment 200 without departing from the scope of the disclosure. For example, the designations of different elements in the manner described is meant to help explain concepts described herein and is not limiting. Further, the environment 200 may include any number of other elements or may be implemented with other systems or environments than those described.

Figure 3A:
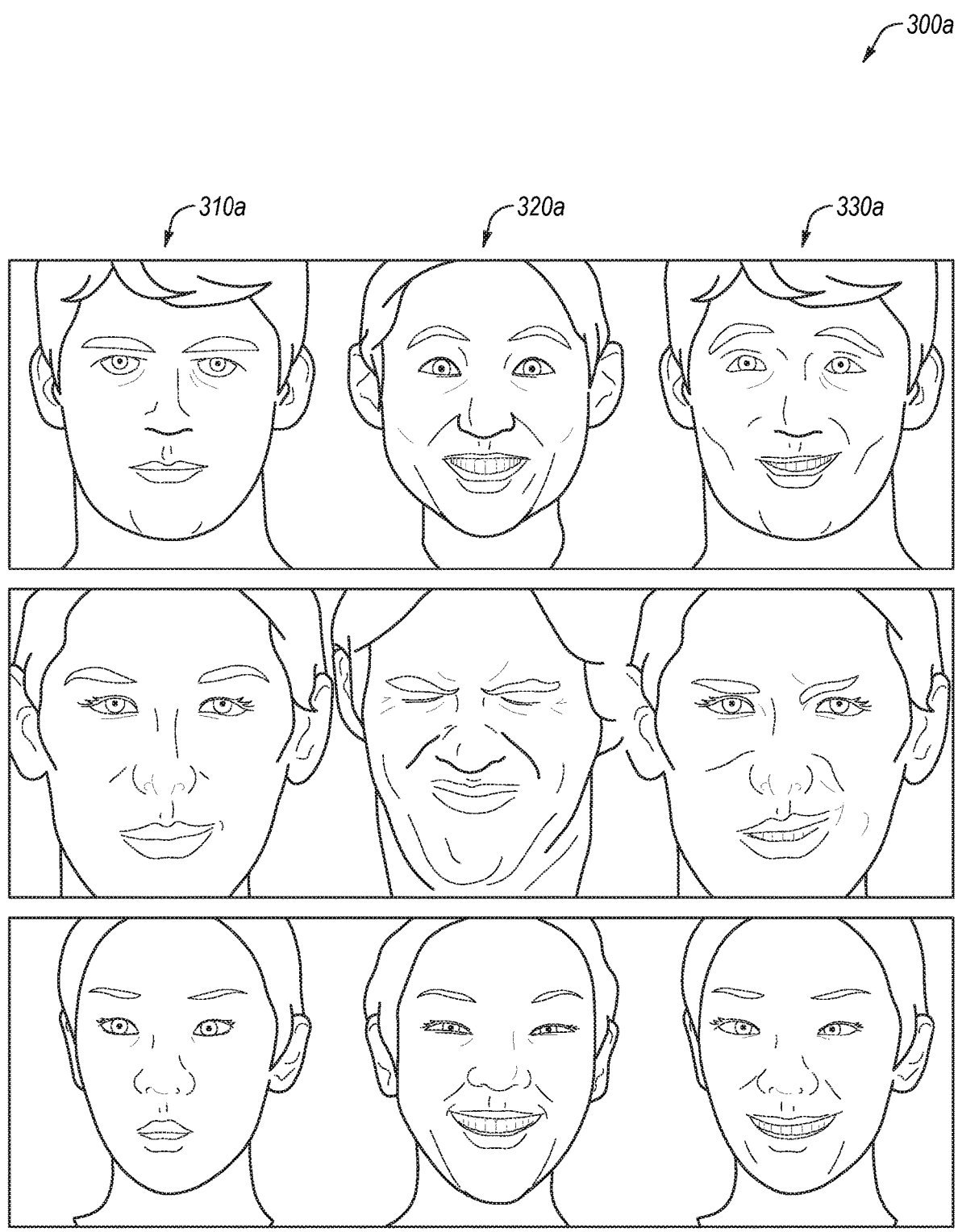
FIGS. 3A and 3B illustrate examples of facial images, including synthesized facial images using different synthesizing techniques.
Figure 3B:
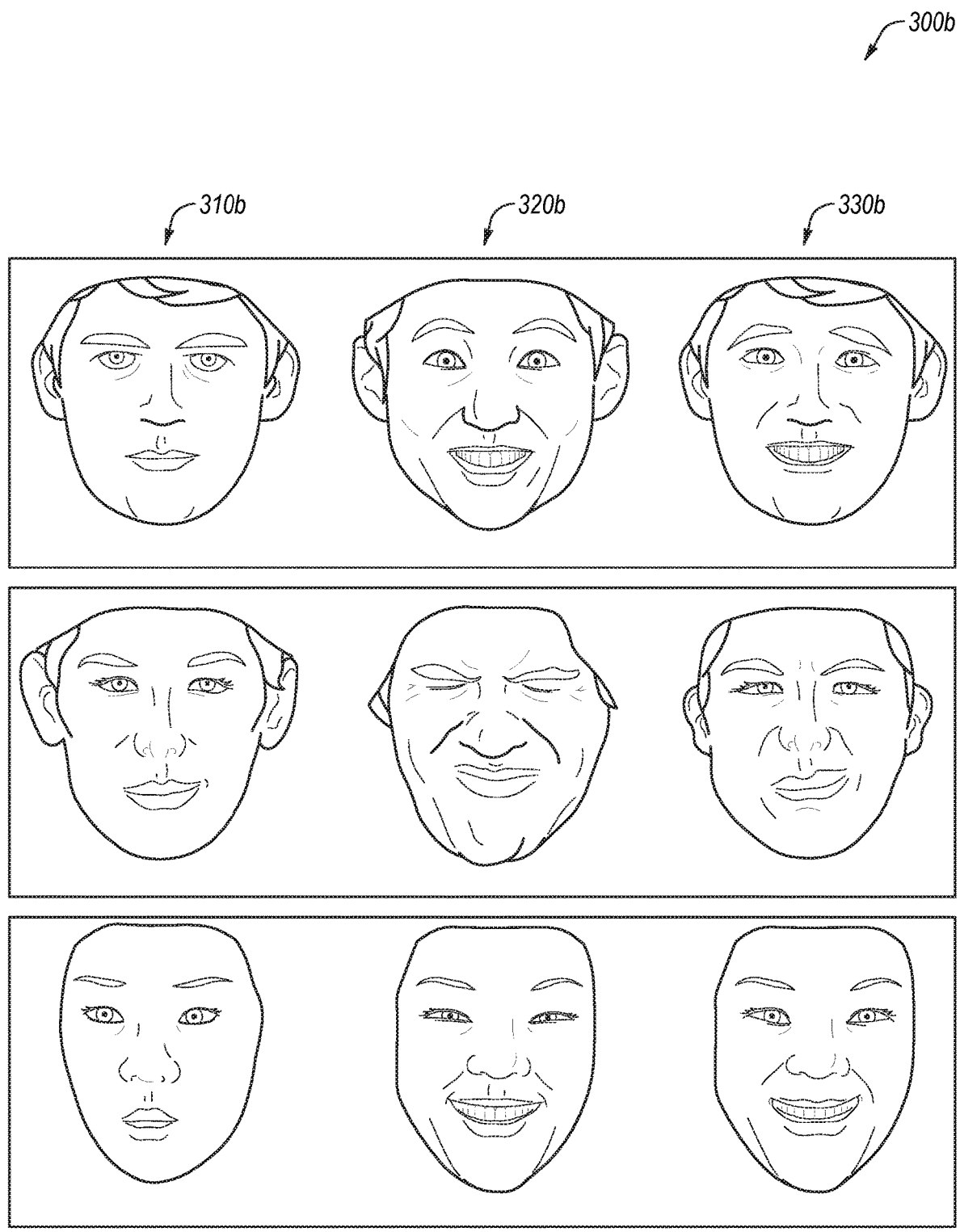

FIGS. 3A and 3B illustrate examples of facial images 300a and 300b, including synthesized facial images 330a and 330b using different synthesizing techniques, in accordance with one or more embodiments of the present disclosure. The synthesized images 330a of FIG. 3A are synthesized based on a 2D registration of input images 310a, and the synthesized images 330b of FIG. 3B are synthesized based on a 3D registration of input images 310b.

The facial images 300a of FIG. 3A include input images 310a, target images 320a, and the synthesized images 330a. The input images 310a may be selected as the images from which the synthesized images are based. In some embodiments, the input images 310a may include facial images with little or no wrinkles and/or a neutral expression. The input images 310a may include faces pointing generally straight on.

In some embodiments, the input images 310a may have a 2D registration of the input image 310a performed. For example, the 2D registration may map the points of the 2D image to various facial features, landmarks, muscle groups, etc. In some embodiments, the 2D registration may map various facial features, landmarks, muscle groups, etc. of the input images 310a to the target image 320a. The synthesized images 330a may be based on the 2D registration of the input images 310a.

The target images 320a may represent the desired facial expression (e.g., a facial image depicting the desired AU combination and intensities to be synthesized to balance the dataset). The input images 310a may or may not be the same identity (e.g., depict the same person) as the target image 320a.

With reference to FIG. 3A, the synthesized images 330a may have various artifacts based on the 2D registration. For example, holes or gaps in the faces may occur, and certain facial features may be skewed or otherwise have an inhuman appearance.

In FIG. 3B, the input images 310b and the target images 320b may be similar or comparable to the input images 310a and the target images 320a of FIG. 3A. A 3D registration of the input images 310b and/or the target images 320b may be performed. For example, rather than a 2D image, a 3D projection of the faces depicted in the input images 310b and the target images 320b may be generated. By doing so, there may be a more complete, robust, and/or accurate mapping between the input images 310b and the target images 320b.

Based on the 3D registration, the synthesized images 330b may be performed using the input images 310b as the base. As can be observed, the synthesized images 330b of FIG. 3B are higher quality than the synthesized images 330a of FIG. 3A. For example, there are fewer artifacts, and the facial features more closely resemble the target images 320b.

Modifications, additions, or omissions may be made to the facial images 300a/300b without departing from the scope of the disclosure. For example, the designations of different elements in the manner described is meant to help explain concepts described herein and is not limiting. Further, the facial images 300a/300b may include any number of other elements or may be implemented with other systems or environments than those described. For example, any number of input images, target images, and/or synthesized images may be used.

FIGS. 4A and 4B illustrate example plots 400a and 400b of intensity distributions of AU combinations in a dataset, in accordance with one or more embodiments of the present disclosure. The plot 400a of FIG. 4A illustrates an imbalanced dataset, and the plot 400b of FIG. 4B illustrates a balanced dataset by synthesizing a number of images to balance the dataset. The plots 400a and 400b may include AU combinations 410a and 410b and corresponding intensities 420a and 420b.

As illustrated by the plot 400a in FIG. 4A, the set of AU combinations 410a may include individual AU combinations 411a, 412a, 413a, 414a, 415a, 416a, and 417a, each of which has corresponding intensities 420a, including the intensities 421a, 422a, 423a, 424a, 425a, and 426a.

Using the AU combination 415a as an example, the first intensity 421a has a relatively small number of images depicting that intensity, while the second, third and fourth intensities 422a, 423a, and 424a have a larger number of images depicting the respective intensities. The fifth intensity 425a has more images than the first intensity 421a, but fewer than the second, third and fourth intensities 422a, 423a, and 424a. The sixth intensity 426a has approximately as many images as the remaining intensities combined.

In some embodiments, it may be determined that the dataset depicted in the plot 400a may be imbalanced and it may be desirable to balance the dataset. For example, a computing device hosting a machine learning system (or any other computing system) may determine that the dataset is imbalanced and a more balanced dataset may perform better at training the machine learning system. In some embodiments, when balancing, the number of images to be synthesized may be determined using any approach to facilitate providing approximately the same number of units in each of the intensities. For example, the balancing may include synthesizing images for other intensities to match the intensity with the largest number of images such that all of the intensities have the same number of images. As another example, the balancing may include a target number of images and synthesizing images in one or more of the intensities to arrive at the target number of images. Additionally or alternatively, certain images from over-sampled intensities may be removed from the dataset to better balance the dataset. As a further example, a total number of images may be determined and that may be divided among the number of intensities to derive a set number of images for each of the intensities. In some embodiments, the determination to balance the dataset may include identifying a number of images for a given AU combination and intensity to be synthesized.

As illustrated in FIG. 4B, after balancing the dataset, each of the intensities 421b-426b may each have the same or approximately the same (e.g., within a threshold number, percentage, etc. of each other) number of images depicting the respective intensities for a given AU combination.

When comparing the data represented in the plots 400a and 400b with respect to an example AU combination, the data in tabular form may be represented below.

| Target AU intensity | 0 | A | B | C | D | E |
|---|---|---|---|---|---|---|
| Imbalanced | 127,815 | 9,084 | 6,476 | 2,243 | 582 | 143 |
| Balanced | 100,000 | 100,000 | 100,000 | 100,000 | 100,000 | 100,000 |

As can be observed in the tabular form, for certain intensities (such as A), if the imbalanced intensities were simply oversampled each image of intensity A would be re-used approximately ten times. However, when the intensity E is considered, each image would be used approximately seven hundred times. According to the present disclosure, rather than resampling, additional images are synthesized to provide a more robust and accurate training dataset.

Modifications, additions, or omissions may be made to the plots 400a/400b without departing from the scope of the disclosure. For example, the designations of different elements in the manner described is meant to help explain concepts described herein and is not limiting.

Figure 5:
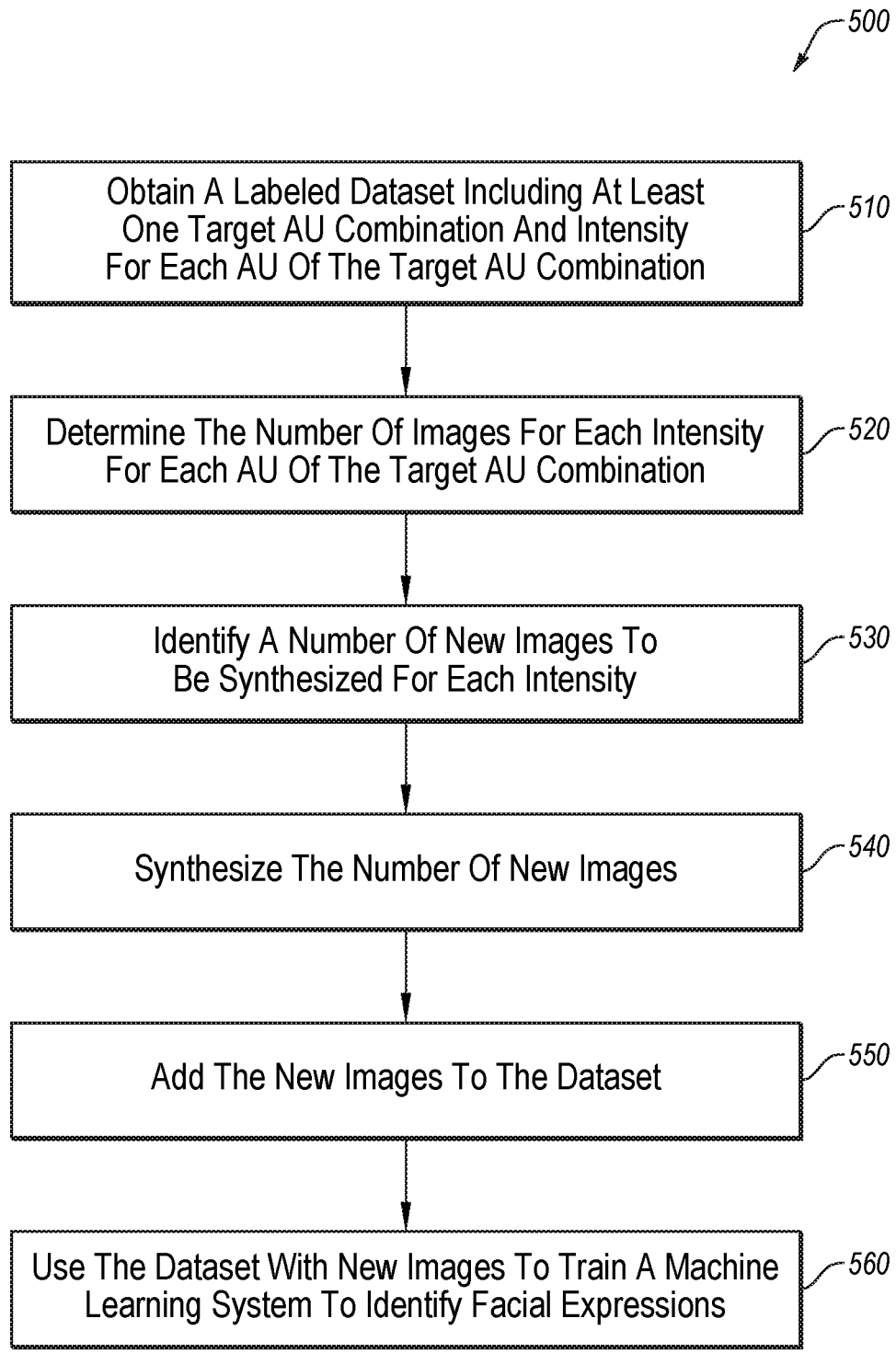
FIG. 5 illustrates an example flowchart of an example method of image synthesis for balanced datasets.

FIG. 5 illustrates an example flowchart of an example method 500 of image synthesis for balanced datasets, in accordance with one or more embodiments of the present disclosure. For example, the method 500 may be performed to generate a more balanced dataset for training a machine learning system to identify facial expressions for an input image (e.g., by identifying the AU combination and corresponding intensities). One or more operations of the method 500 may be performed by a system or device, or combinations thereof, such as any computing devices hosting any components of the environments 100 and/or 200 of FIG. 1 and/or 200, such as a computing device hosting the training dataset 110, the machine learning system 130, etc. Although illustrated as discrete blocks, various blocks of the method 500 may be divided into additional blocks, combined into fewer blocks, or eliminated, depending on the desired implementation.

At block 510, a labeled dataset may be obtained that includes at least one target AU combination and intensity for each AU of the target AU combination. For example, a dataset (such as the dataset 110 of FIG. 1 and/or the dataset 210 of FIG. 2) may be obtained that includes images that are labeled as to the AU combination depicted in the image, and the corresponding intensities for the AUs of the AU combination.

At block 520, a determination may be made regarding the number of images for each intensity for each AU of the target AU combination in order to better balance the dataset. For example, the number of images depicting each of the intensities for each AU of the target AU combination may be determined. In some embodiments, the labeled dataset may include other AU combinations and/or intensities that may or may not correspond to the AUs of the target AU combination. For example, the images to be synthesized may correspond to AUs and/or AU combinations with associated intensities that may or may not be included in the labeled dataset 510. For example, as illustrated in FIG. 4A, the AU combinations 411a includes five different intensities, while others (such as AU combination 414a) include six different intensities. As illustrated in FIG. 4B, the AU combination 411b includes all six intensities, even though the original dataset did not include images with the sixth intensity 421b. While the example is given of an intensity, an AU combination may also be identified for the synthesis of images where the AU combination may or may not be included in the labeled dataset of the block 510.

At block 530, a number of new images to be synthesized for each intensity may be identified. For example, the various intensities of the various AUs of the AU combination may be compared to determine which intensities and/or AUs may benefit from additional images being synthesized. In some embodiments, such identification may include selecting a target number of images and determining the deficit to be synthesized. Additionally or alternatively, such identification may include determining how many images for a given intensity would facilitate matching the highest, second highest, or mean/median number of images of one of the intensities.

At block 540, the number of new images may be synthesized. In some embodiments, a neutral-expressioned input image may be used when synthesizing the new images. Additionally or alternatively, a 3D registration may be made of the input image and/or the target image (e.g., the image depicting the target AU combination and intensity for which the additional image is being synthesized) to facilitate synthesis of a high-quality image. In some embodiments, one or more loss parameters may be utilized when synthesizing the images to facilitate generation of high quality images.

At block 550, the new images may be added to the labeled dataset of the block 510. In these and other embodiments, one or more images of the dataset of the block 510 may be removed. Upon completion of the block 550, a complete dataset with balanced intensities across the AUs of the target AU combination may be achieved.

At block 560, the dataset of the block 550 with the new images generated at the block 540 may be used to train a machine learning system to identify facial expressions. For example, a CNN may be trained using the dataset to facilitate labeling of an image using the CNN. After being trained, the CNN may be provided an input image of a face that is not labeled regarding the facial expression depicted (for example, the AU combination and/or associated intensities). Using the trained CNN, the input image may be labelled with an identified facial expression (for example, by identifying the AU combination and/or associated intensities depicted).

Modifications, additions, or omissions may be made to the method 500 without departing from the scope of the disclosure. For example, the operations of the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6A:
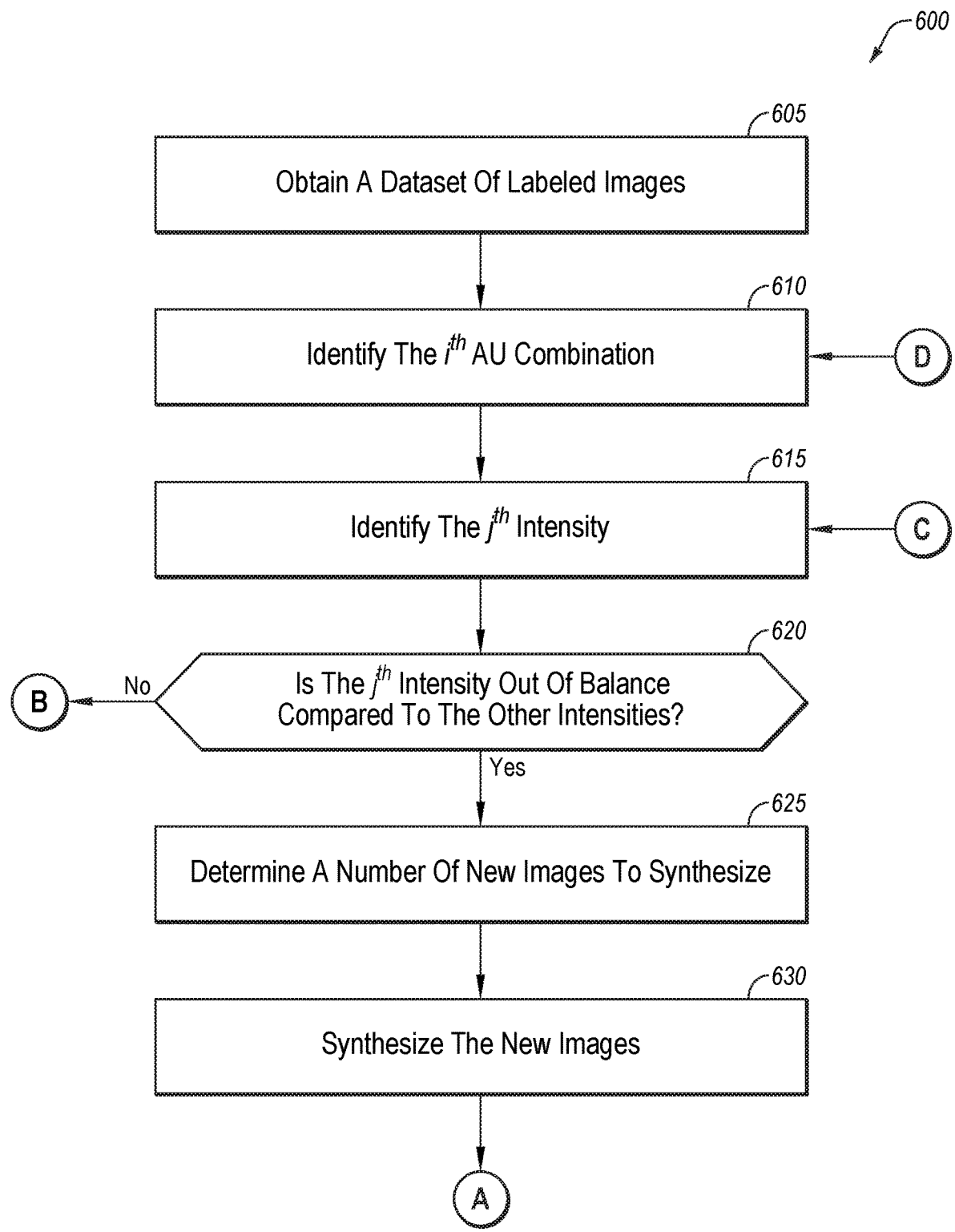
FIGS. 6A and 6B illustrate another example flowchart of another example method of image synthesis for balanced datasets.
Figure 6B:
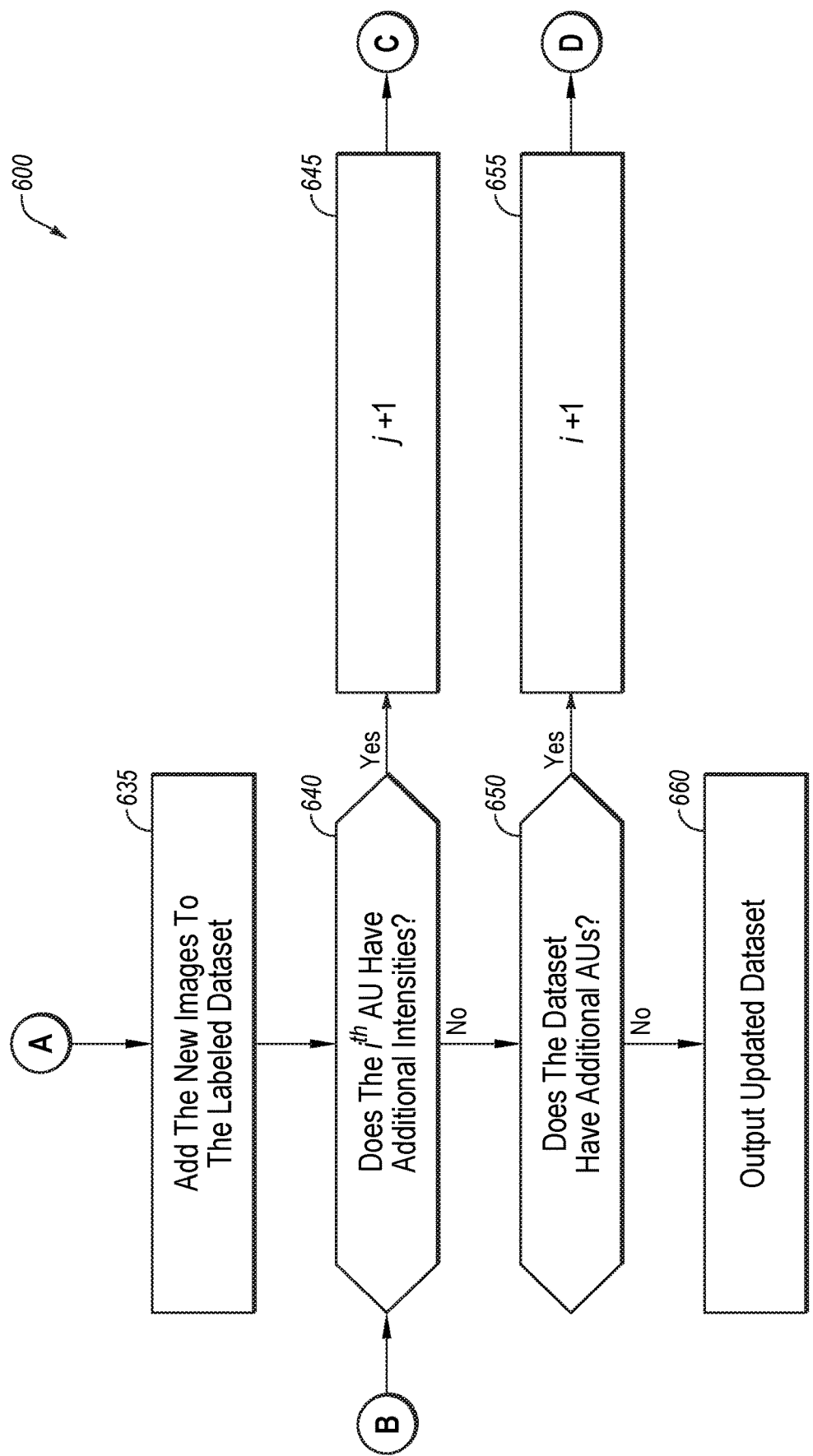

FIGS. 6A and 6B illustrate another example flowchart of another example method 600 of image synthesis for balanced datasets, in accordance with one or more embodiments of the present disclosure. One or more operations of the method 600 may be performed by a system or device, or combinations thereof, such as any computing devices hosting any components of the environments 100 and/or 200 of FIG. 1 and/or 200, such as a computing device hosting the training dataset 110, the machine learning system 130, etc. Although illustrated as discrete blocks, various blocks of the method 600 may be divided into additional blocks, combined into fewer blocks, or eliminated, depending on the desired implementation.

At block 605, a dataset of labeled images may be obtained. The block 605 may be similar or comparable to the block 510 of FIG. 5. In some embodiments, obtaining the labeled dataset may include an administrator or other user manually identifying one or more AU combinations and/or intensities for one or more of the images in the dataset.

At block 610, the $i^{th}$ AU of a target AU combination may be identified. For example, an initial pass through the block 610 may initialize i as one, and the first AU in an AU combination of a set of target AU combinations may be identified.

At block 615, the $j^{th}$ intensity may be identified. For example, an initial pass through the block 615 may initialize j as one, and the first intensity of the $i^{th}$ AU of the AU combination may be identified.

At block 620, a determination may be made whether the $j^{th}$ intensity is out of balance compared to the other intensities. For example, the number of images depicting the $j^{th}$ intensity may be compared to the number of images depicting other intensities of the $i^{th}$ AU of the AU combination and/or other AUs and/or AU combinations. As another example, the number of images depicting the $j^{th}$ intensity may be compared to a target number of images. If the $j^{th}$ intensity is out of balance, the method 600 may proceed to the block 625. If the $j^{th}$ intensity is not out of balance, the method 600 may proceed to the block 640 via "B."

At block 625, a number of new images to synthesize may be determined. For example, based on $j^{th}$ intensity being out of balance, the number of new images may represent how many images would make the $j^{th}$ intensity balanced. In some embodiments, the number of new images may represent how many additional images would bring the $j^{th}$ intensity to the target number of images, or to the same number of images as the highest number intensity, etc.

At block 630, the number of new images determined at the block 625 may be synthesized. The block 630 may be similar or comparable to the block 540. After the block 635, the method 600 may proceed to the block 635 via "A" as depicted in FIG. 6B.

At block 635, the new images may be added to the labeled dataset. The block 635 may be similar or comparable to the block 550.

At block 640, a determination may be made whether the $i^{th}$ AU has additional intensities that have not yet been analyzed. If there are additional intensities, the method 600 may proceed to the block 645. If there are no additional intensities (e.g., all intensities have been analyzed for balance), the method 600 may proceed to the block 650 and the value of j may be reset to one.

At block 645, the value of j may be incremented by one, and the method 600 may return to the block 615 via "C" where the next intensity may be analyzed and re-balanced by synthesizing any additional images for the next intensity.

At block 650, a determination may be made whether the dataset has additional AUs and/or AU combinations that have not yet been analyzed. If there are additional AUs and/or AU combinations for analysis, the method 600 may proceed to the block 645. If there are additional AUs and/or AU combinations (e.g., not all AUs and/or AU combinations have been analyzed), the method 600 may proceed to the block 655. If there are no additional AUs and/or AU combinations (e.g., all AUs and/or AU combinations have been analyzed for balance), the method 600 may proceed to the block 660. For example, before proceeding to the block 660, the method 600 may have generated a dataset that is balanced across the intensities and/or AU combinations of the dataset.

At block 655, the value of i may be incremented by one, and the method 600 may return to the block 610 via "D" where the next AUs and/or AU combination may be analyzed and re-balanced.

At block 660, the updated dataset may be output. For example, the dataset that includes the new synthesized images may be output such that the updated dataset can be used to train a machine learning system to identify which AUs and/or intensities are depicted in a facial image.

Modifications, additions, or omissions may be made to the method 600 without departing from the scope of the disclosure. For example, the operations of the method 600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 7:
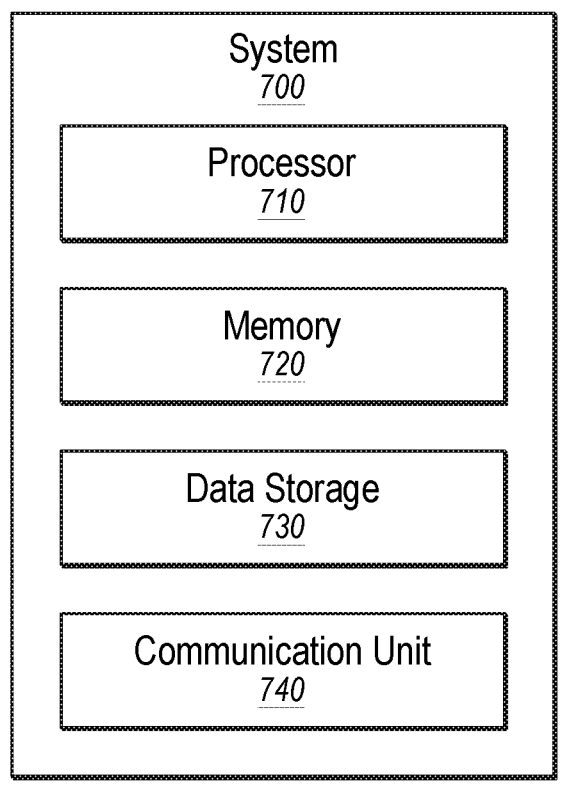
FIG. 7 illustrates an example computing system.

FIG. 7 illustrates an example computing system 700, according to at least one embodiment described in the present disclosure. The computing system 700 may include a processor 710, a memory 720, a data storage 730, and/or a communication unit 740, which all may be communicatively coupled. Any or all of the environments 100 and 200 of FIGS. 1 and 2, components thereof, or computing systems hosting components thereof may be implemented as a computing system consistent with the computing system 700.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform any of the methods 500 and/or 600 of FIGS. 5-6, respectively. For example, the processor 710 may obtain instructions regarding determining a number of images to be synthesized to balance a dataset, and synthesizing the images.

The memory 720 and the data storage 730 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skill in the art, after reviewing this disclosure, may recognize that modifications, additions, or omissions may be made to the system 700 without departing from the scope of the present disclosure. For example, the system 700 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
    obtaining a dataset including a target Action Unit (AU) combination and a plurality of labeled images of the target AU combination with at least a first category of intensity for each AU of the target AU combination and a second category of intensity for each AU of the target AU combination;
    determining that the first category of intensity for a first AU has a higher number of labeled images than the second category of intensity for the first AU;
    based on the determination, identifying a number of new images to be synthesized in the second category of intensity for the first AU;
    synthesizing the number of new images with the second category of intensity for the first AU, at least one of the number of new images synthesized based on a three-dimensional rendering of a two-dimensional first image of the plurality of labeled images, the synthesizing the number of new images including generating the three-dimensional rendering; and
    adding the new images to the dataset.

2. The method of claim 1, further comprising training a machine learning system to identify facial expressions using the dataset after the new images are added to the dataset.

3. The method of claim 1, further comprising labeling at least one image of the number of new images to identify a given intensity for a given AU expressed in the at least one image.

4. The method of claim 1, wherein synthesizing the number of new images comprises randomly selecting an input image, wherein the input image includes at least one AU outside of AUs that make up the target AU combination, at least one of the new images based upon the randomly selected input image.

5. The method of claim 1, wherein the images of the dataset include two-dimensional images, three-dimensional face shapes, or combinations thereof.

6. The method of claim 1, wherein after the new images are added to the dataset, the first category of intensity and the second category of intensity have an equal number of images.

7. The method of claim 1, further comprising synthesizing a second set of new images in a third category of intensity for the first AU based on the third category of intensity for the first AU having fewer images than the first category of intensity for the first AU.

8. The method of claim 1, further comprising synthesizing a second set of new images in the second category of intensity for a second AU based on the second category of intensity for the second AU having fewer images than a first category of intensity for the second AU.

9. The method of claim 1, further comprising:
adding the new images to a second dataset, the second dataset only including synthesized images; and
training a machine learning system to identify facial expressions using the second dataset.

10. At least one non-transitory computer-readable media configured to store one or more instructions that in response to being executed by at least one computing system cause performance of the method of claim 1.

11. A system comprising:
one or more processors; and
one or more computer-readable media configured to store instructions that in response to being executed by the one or more processors cause the system to perform operations, the operations comprising:
obtaining a dataset including a target Action Unit (AU) combination and a plurality of labeled images of the target AU combination with at least a first category of intensity for each AU of the target AU combination and a second category of intensity for each AU of the target AU combination;
determining that the first category of intensity for a first AU has a higher number of labeled images than the second category of intensity for the first AU;
based on the determination, identifying a number of new images to be synthesized in the second category of intensity for the first AU;
synthesizing the number of new images with the second category of intensity for the first AU, at least one of the number of new images synthesized based on a three-dimensional rendering of a two-dimensional first image of the plurality of labeled images, the synthesizing the number of new images including generating the three-dimensional rendering; and
adding the new images to the dataset.

12. The system of claim 11, wherein the operations further comprise training a machine learning system to identify facial expressions using the dataset after the new images are added to the dataset.

13. The system of claim 11, wherein the operations further comprise labeling at least one image of the number of new images to identify a given intensity for a given AU expressed in the at least one image.

14. The system of claim 11, wherein synthesizing the number of new images comprises randomly selecting an input image, wherein the input image includes at least one AU outside of AUs that make up the target AU combination, at least one of the new images based upon the randomly selected input image.

15. The system of claim 11, wherein the images of the dataset include two-dimensional images, three-dimensional face shapes, or combinations thereof.

16. The system of claim 11, wherein after the new images are added to the dataset, the first category of intensity and the second category of intensity have an equal number of images.

17. The system of claim 11, wherein the operations further comprise synthesizing a second set of new images in the second category of intensity for a second AU based on the second category of intensity for the second AU having fewer images than a first category of intensity for the second AU.

18. The system of claim 11, wherein the operations further comprise:
adding the new images to a second dataset, the second dataset only including synthesized images; and
training a machine learning system to identify facial expressions using the second dataset.

* * * * *